INVENTOR
ALDEN J. LABORDE
TOM S. GRAHAM

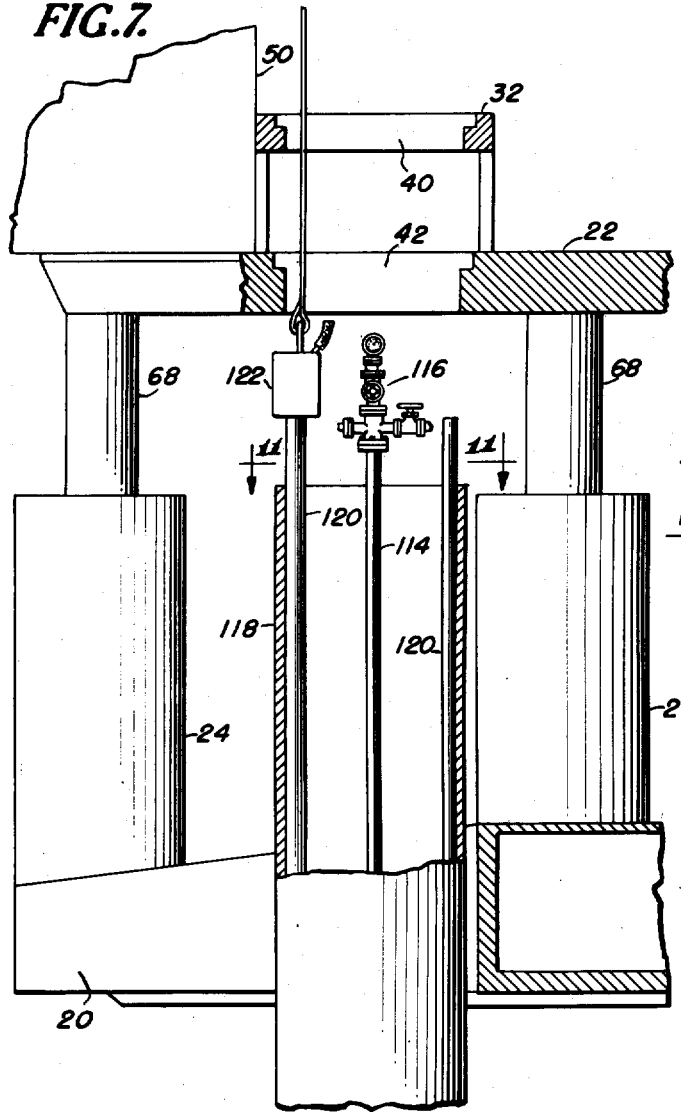
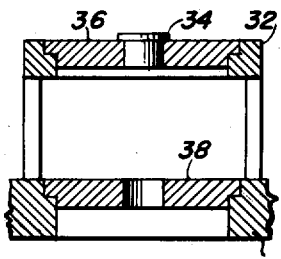
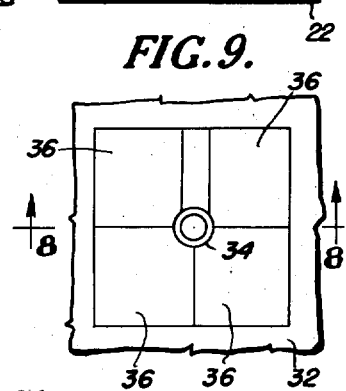
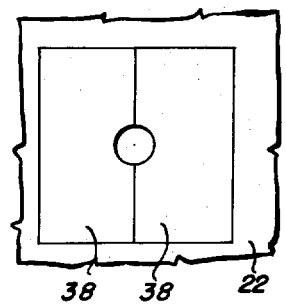
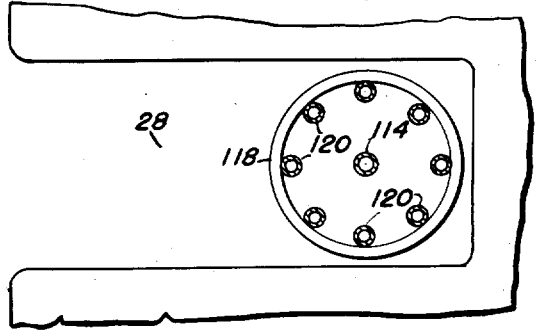

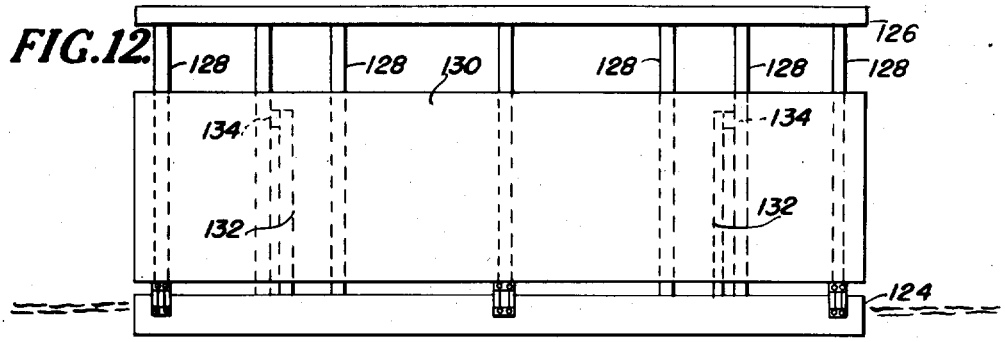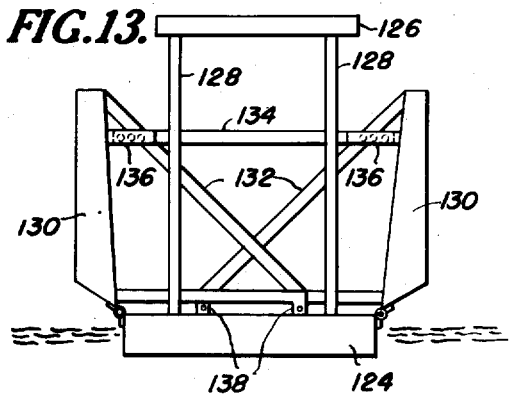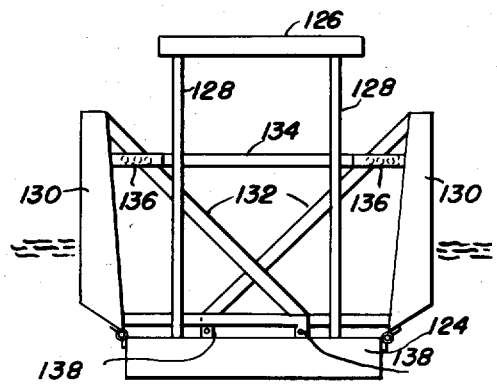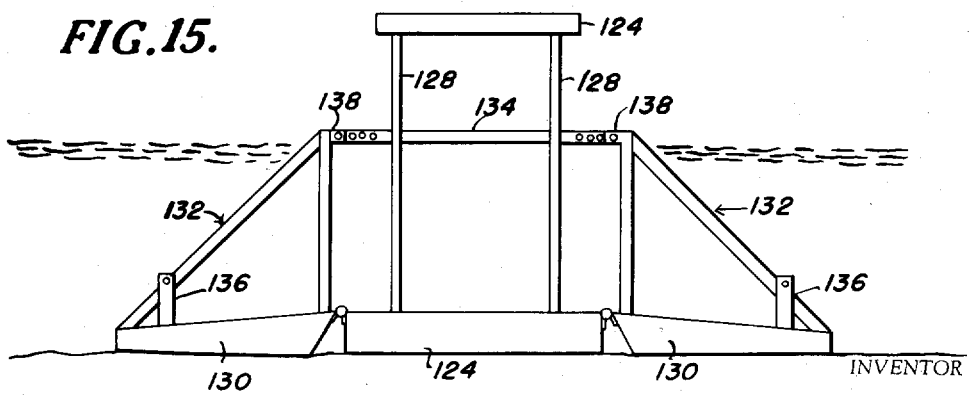

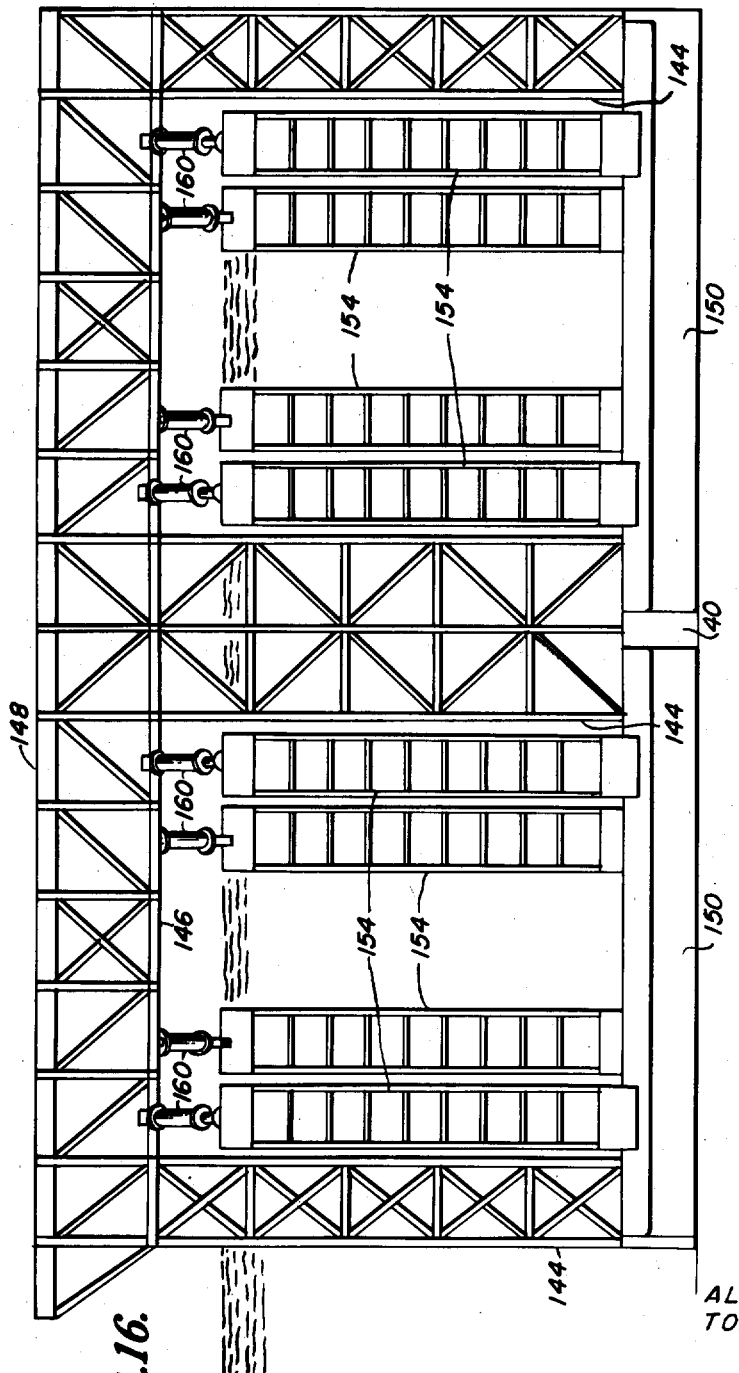

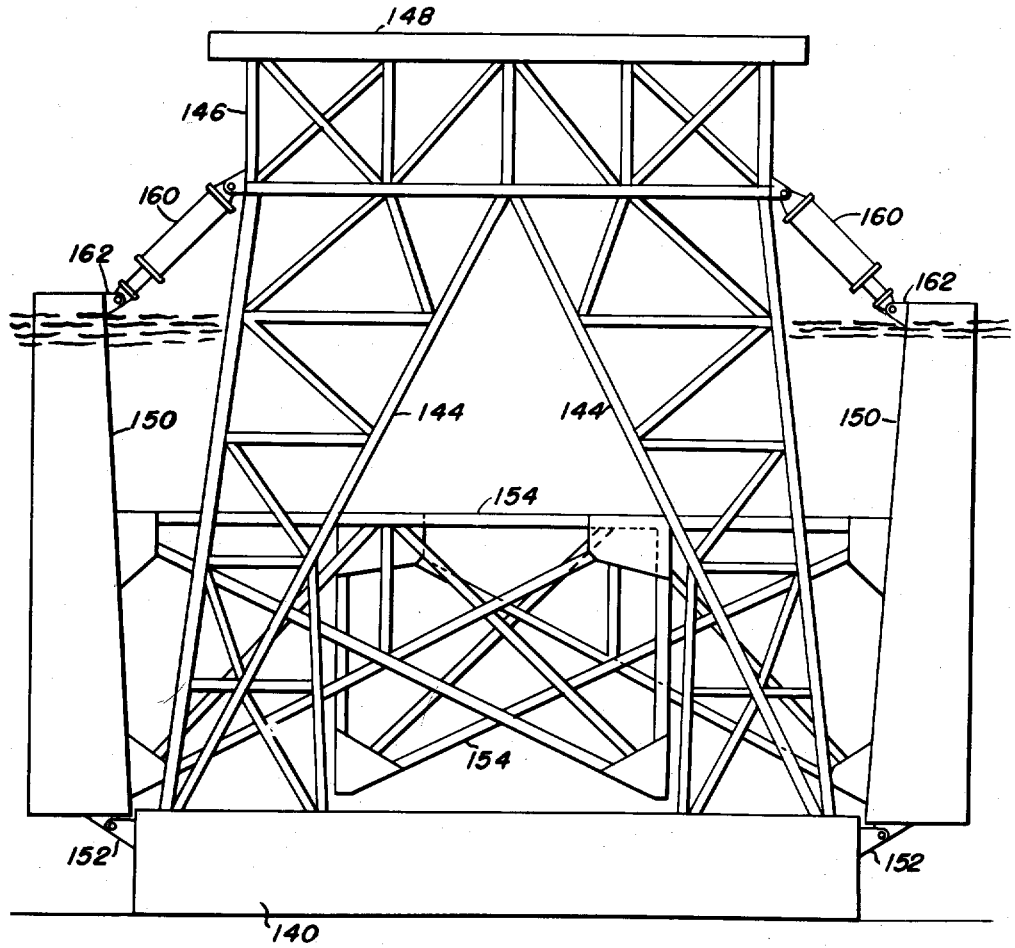

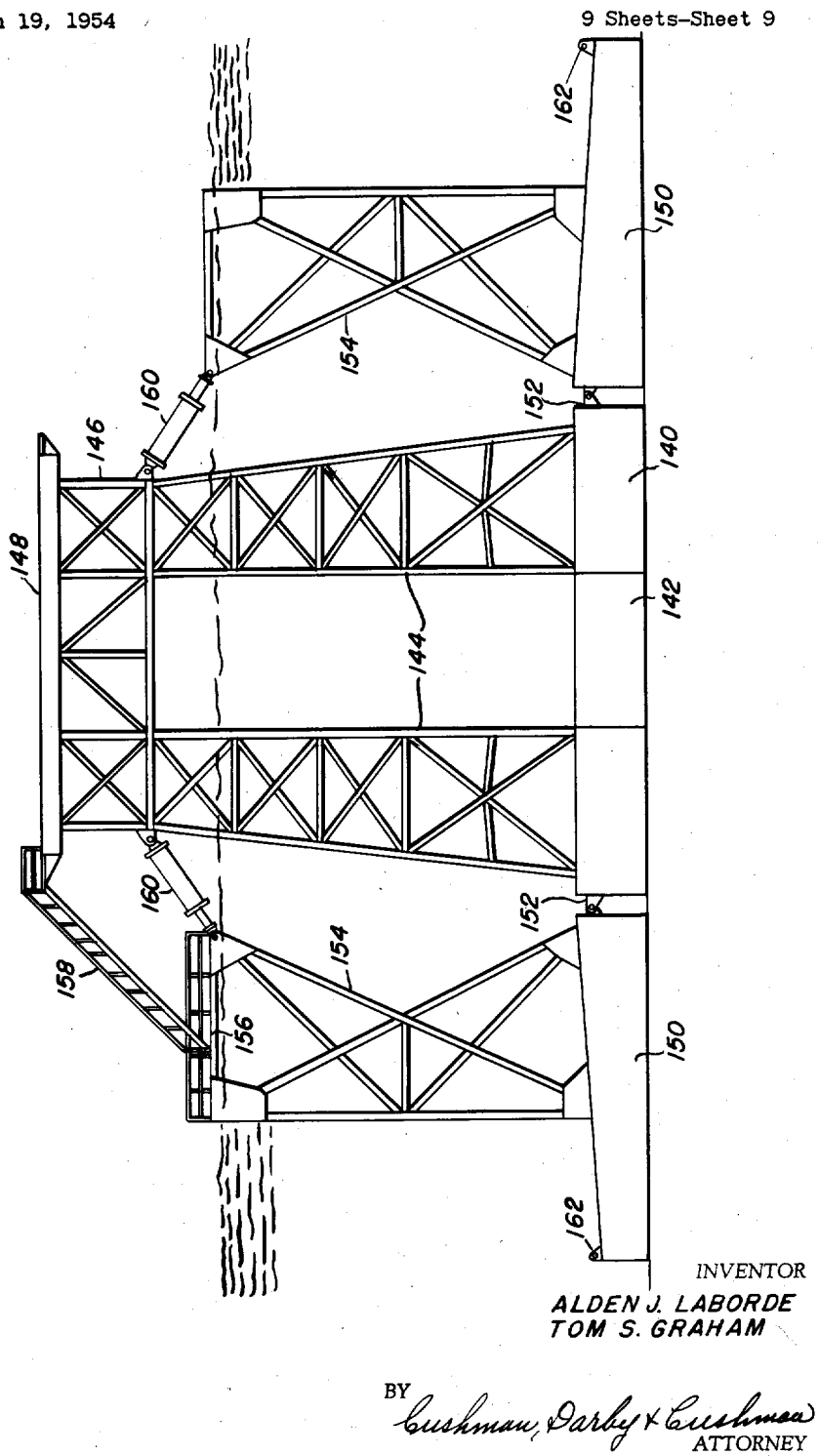

United States Patent Office 2,921,442
Patented Jan. 19, 1960

2,921,442

SUBMERGIBLE BARGE

Alden J. Laborde, New Orleans, La., and Tom S. Graham, Alvin, Tex., assignors to Ocean Drilling & Exploration Company, New Orleans, La., a corporation of Delaware Application March 19, 1954, Serial No. 423,500

(Filed under Rule 47(a) and 35 U.S.C. 116)

14 Claims. (Cl. 61—46.5)

This invention relates to a submergible barge, and more particularly to a mobile barge which, when submerged, will provide a fixed above-water platform or base from which well drilling operations can be conducted at off-shore locations. It will be understood, however, that the principles of the invention are equally applicable to submergible barges adapted to provide above-water platforms for other uses, such as an oil production and storage platform, a crane or construction platform, a lighthouse base, or any use wherein a temporary island is desired and mobility is a factor.

The drilling of oil and gas wells in off-shore locations wherein water depths are considerable, e.g., of the order of 15 to 40 feet or greater, is becoming increasingly important. Submergible drilling barges for such deepwater usage are known in the art, as exemplified by United States Patent No. 1,681,533 to Giliasso. Such barges usually comprise a submergible main floatation structure having a rigid openwork supporting structure, e.g., spaced pillars or posts, mounted thereon. A working platform from which drilling operations are carried out is supported on the openwork structure a considerable distance above the submergible floatation structure. In operation, the barge is towed to a desired location and the floatation structure is then sunk to the marine bottom, to thus provide a fixed working platform which is located above normal wave height and supported on an openwork understructure that minimizes wind and wave forces thereon. After the well has been drilled, the barge may be refloated and towed to another location.

It is necessary in the use of such barges to maintain stability of the entire barge during the submerging and refloating operations in order to avoid capsizing. It readily will be seen that when the floatation structure sinks beneath the surface of the water, a highly unstable condition will exist unless some means is provided for stabilizing the barge until the floatation structure comes to rest on the marine bottom. This may be provided for by the use of some form of stabilizing auxiliary pontoons attached to the main floatation structure, as disclosed, for example, in the aforementioned Giliasso patent, and in United States Patents 2,540,878 to Hayward, 123,402 to Janicki, 458,473 to MacDonald, and 210,185 to Clark et al.

It also will be seen that, because of the heavy equipment mounted on the working platform, e.g., a drilling mast, draw works, etc., a submergible drilling barge of this nature tends to be very top heavy, i.e., has a high center of gravity with consequent difficulty in maintaining a metacenter safely thereabove. Additionally, even though the working platform is carried on an openwork supporting structure, wind and wave action may impart extremely large overturning moments to the barge, both when afloat and when on the bottom, and, further, in some instances even shift or slide the barge about on the marine bottom. This situation may be relieved by using the submergible auxiliary pontoons disclosed in the aforementioned Hayward patent to extend the bottom-bearing area of the barge when on the bottom. Overturning moments and sliding forces on a submergible barge when on the bottom may be counteracted by the use of any various kinds of pivoted anchoring means, such as flap anchors as disclosed in United States Patent No. 2,589,153 to Smith, or similar anchoring means shown in the earlier patent to MacDonald, 458,473. Such means have been employed to stabilize dredges or similar equipment used on land, as referred to in United States Patents 1,108,001, 899,597, and 364,761.

Accordingly, it is an object of this invention to provide a submergible barge having a main submergible floatation structure with improved means for maintaining stability of the barge during a submerging operation.

It is another object of this invention to provide a deep-water submergible barge with improved means for providing an extended bottom-bearing area when the barge is sunk to the marine bottom.

It is another object of this invention to provide a deep-water submergible drilling barge with improved means for effectively maintaining complete stability thereof during a submerging operation, and which means also provide extended bottom-bearing areas when the barge is sunk to the marine bottom.

It is a further object of this invention to provide an improved rugged deep-water submergible barge which has a lower center of gravity than previous barges to thus assure maintenance of its metacenter well above its center of gravity, both when afloat and during submerging operations.

Other objects and advantages of the invention will become apparent from the following description and accompanying drawings, in which:

Figure 7 is an enlarged fragmentary longitudinal vertical sectional view of the barge shown in Figure 1, showing sections of the drilling floor and the deck thereof removed.

Figure 8 is a fragmentary sectional view taken substantially on line 8—8 of Figure 9 and illustrating the removable sections of the drilling floor and the deck.

Figure 9 is a fragmentary plan view of a portion of the drilling floor showing the removable sections thereof.

Figure 10 is a view corresponding to Figure 9, but showing the removable sections of the main deck.

Figure 11 is a fragmentary horizontal sectional view taken substantially on line 11—11 of Figure 7.

Figure 12 is a somewhat diagrammatic side elevational view of a modification of a submergible barge embodying this invention.

Figures 13 to 15 are end elevational views of the barge shown in Figure 12 and illustrating the steps involved in submerging the same.

Figure 16 is a side elevational view of another modification of a submergible barge embodying this invention and illustrating the position of the parts when the barge is submerged to a marine bottom.

Figure 17 is a bow end elevational view of the barge shown in Figure 16, but illustrating the position of the parts for towing, submerging, and refloating operations.

Figure 18 is a stern end elevational view of the barge shown in Figure 16.

Figure 1:
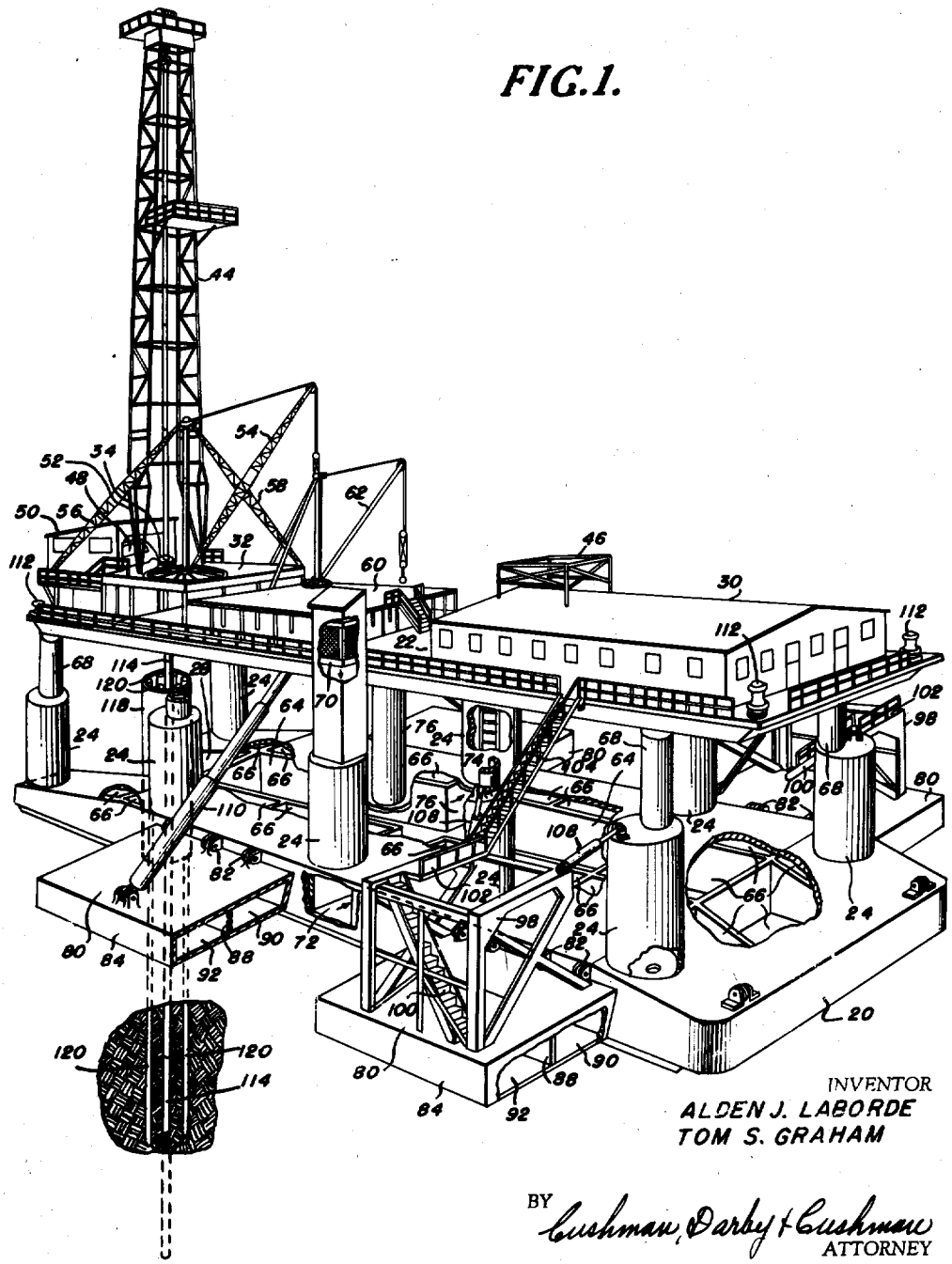
Figure 1 is a perspective view of a drilling barge embodying this invention, with portions broken away to illustrate details more clearly. The parts of the barge are shown in the position assumed when the barge is submerged and rests on a marine bottom.

Referring now to the drawings, there is shown a deep-water drilling barge embodying the principles of this invention. The barge comprises a completely enclosed submergible water-tight integral main floatation structure or hull 20, preferably of steel construction, having a somewhat narrower platform or main deck 22 supported thereabove on a plurality of large-diameter steel caissons 24 secured to and arranged longitudinally along each side of the hull. Thus, the hull 20, caissons 24, and main deck 22 comprise a completely integrated structure. As an example of an actual application of this invention to a very large deep-water drilling barge, the length of the hull 20 may be of the order of 220 feet and its width or beam of the order of 74 feet, while the upper surface of the main deck 22 may be of the order of 63 feet above the undersurface of the hull. Thus, when the barge is sunk, as later described, in 40 feet of water, there will be a clearance of about 23 feet from the waterline 26 (Figures 2 and 6) to the upper surface of the main deck 22. In the example shown, there are five deck-supporting caissons 24 spaced substantially evenly along each side of the hull 20. The latter preferably has a flat undersurface for maximum bottom-bearing area and is generally rectangular in plan view with a relatively-short drilling slot 28 (Figures 1 and 7) extending centrally thereinto from the aft end thereof. The short length of the slot 28 assures maximum bottom-bearing area for the hull.

On the fore part of the deck 22 is a deckhouse 30 for accommodation of the crew, while on the aft part of the deck is a raised drilling floor or platform 32 having a rotary 34 therein located directly above the drilling slot 28. For reasons later described, it is preferable that sections 36 and 38 of the drilling floor 32 and of the main deck 22, respectively, disposed immediately over the drilling slot 28 in the hull are removable to provide enlarged aligned openings 40 and 42, as shown in Figure 7, having substantially the same transverse width as the drilling slot and a length susbtantially equal to their width. A drilling mast or derrick 44 is pivotally mounted on the drilling floor 32 for movement between a vertically-erected position (Figures 1 and 3) and a substantially-horizontal stowed position (Figure 2) wherein a top portion of the derrick rests on a supporting framework 46 located on top of the deckhouse 30. The derrick 44 is retained in its stowed position whenever the barge is afloat, in order to maintain the center of gravity of the derrick as low as possible during submerging, raising, and towing operations. Immediately aft of the drilling floor 32 and slightly therebelow, conventional draw works 48 are enclosed within a housing 50 that is also raised above the main deck. Extending above the housing 50 is a gin pole 52 having pairs of front and rear legs respectively supported on the drilling floor and straddling and secured to the draw works housing. Through the use of the gin pole 52, as is described generally in United States Patent No. 2,475,933, the derrick 44 may be raised and lowered between its erected and stowed positions.

To one side and slightly forward of the base of the derrick 44 is a large stiff-leg crane 54 having one brace leg 56 thereof extending directly rearwardly for attachment to a walkway located alongside the housing 50, and the other brace leg 58 extending transversely across the drilling floor 32 for attachment to the opposite side thereof. This transverse leg 58, of course, must be removed during derrick raising and lowering operations. Immediately forward of the drilling floor 32 and slightly therebelow is a pipe rack 60 which is raised above the main deck 22. The main deck space beneath the pipe rack 60 may be used for drilling mud settling tanks (not shown) and for storage of miscellaneous equipment. A smaller stiff-leg crane 62 is located on an aft corner of the pipe rack 60 on the opposite side of the barge from the larger crane 54.

The hull 20, immediately forward of the drilling slot 28 therein, is provided with an engine room compartment 64 (Figure 1) of substantially the same width as the slot but elongated longitudinally of the hull. Located in this compartment 64 is drilling equipment (not shown), such as main internal combustion engines, main and auxiliary generators, mud pumps, cementing pumps, and miscellaneous engine auxiliaries. Additionally, the engine room compartment 64 has storage tanks or bins (not shown) therein for all bulk supplies, such as drilling mud, cement, fuel, potable water, etc. Further, the engine room compartment 64 contains ballast control equipment (not shown) which includes ballast pumps and a ballast manifold that communicates with seacocks. Substantially all of the remainder of the hull interior, i.e., along both sides and forward of the engine room 64, is divided into a plurality of separate ballast compartments or tanks 66 into which water ballast may be admitted selectively through a conventional conduit and valving arrangement (not shown) associated with the ballast manifold, and from which water ballast may be pumped selectively by the ballast pumps, via the same arrangement.

Each of the deck-supporting caissons 24, except the middle one on each side, communicates directly with the ballast compartment 66 immediately therebelow to provide space within the caissons for additional water ballast and to provide controllable stabilizing buoyancy, as will be later explained. Slightly above the maximum-depth water line 26 of the barge, i.e., about 40 feet above the hull undersurface, the caissons 24 are reduced in diameter and are continued upwardly by inboardly-offset extensions 68. Since it is primarily the above-water-level portions of the caissons 24 that are affected by wave and wind action, the reduced caisson extensions 68 minimize wave and wind forces on the caissons to thereby reduce possible overturning moments on the barge when sunk to the marine bottom.

The extension of the middle caisson 24 on the starboard side of the hull 20 preferably is enlarged and extends upwardly beyond the main deck 22. A vertical shaft within this caisson houses an elevator 70 which provides rapid access between the main deck 22 and a lateral passageway 72 in the hull 20 that communicates with the engine room compartment 64. The opposite deck-supporting caisson has an escape ladder 74 located therein to provide emergency access between the main deck 22 and another lateral passageway 76 in the hull 20 communicating with the engine room 64. Still another of the supporting caissons 24 is provided with a duct (not shown) therein for supplying air to the engine room compartment 64 by blowers (not shown). The escape trunk caisson enclosing the ladder serves as an exhaust vent so that the engine room compartment 64 is adequately ventilated. Slightly aft of the middle caissons and located immediately above the engine room compartment 64 is a hollow column 76 extending between the hull 20 and the main deck 22. The top of this column 76 is enlarged to provide a control room 78 for submerging and raising operations and having therein appropriate remote controls (not shown) for the ballast pumps and the ballast manifold valving arrangement, as well as other control equipment necessary for such operations.

Figure 2:
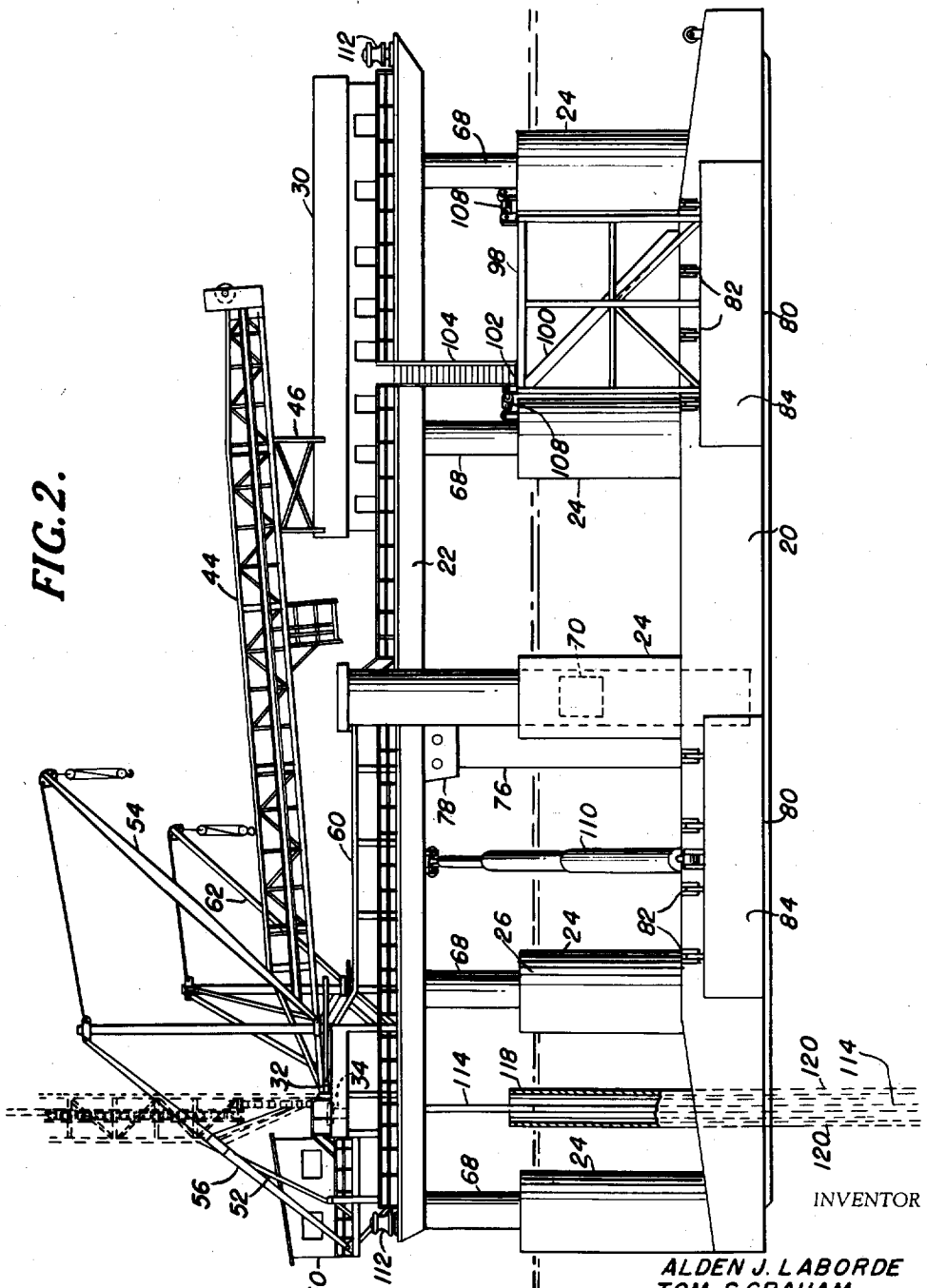
Figure 2 is a side elevational view of the barge shown in Figure 1, but with the drilling derrick shown in its stowed position.

Secured to each side of the hull 20 are two pairs of submergible pontoons 80. The fore pontoons 80 on each side are located between the first and second deck-supporting caissons 24, while the aft pontoons on each side are located between the third and fourth supporting caissons. Each pontoon 80 is substantially rectangular in plan view and is hinged to the hull 20 at the upper edge thereof by two or more longitudinally-spaced hinges 82 for lateral pivotal movement between an upper upright position (Figures 3, 4, and 5) and a lower substantially-horizontal position (Figures 1, 2, and 6) wherein the flat undersurface of each pontoon is substantially flush with the flat undersurface of the hull 20. In its upright position, it will be seen that each pontoon 80 is disposed substantially entirely above the upper surface of the hull 20 with its outboard side 84 on a level with the lower ends of the caisson extensions 68, i.e., slightly above the maximum-depth waterline 26 (Figure 2). In its upper position, each pontoon 80 may be secured in place against downward pivotal movement by one or more turnbuckles 86 detachably connected to appropriate lugs on the pontoons and on the barge superstructure. In place of the turnbuckles 86, other suitable securing means (not shown), such as a chain or a shackle, may be employed. Each pontoon 80 is interiorly divided by a central partition 88 into inboard and outboard ballast tanks or compartments 90 and 92. Conduits 94 (Figure 3) extend from each of the ballast tanks 90 and 92 of each pontoon 80 into the hull and are connected to the ballast manifold therein for admitting water ballast selectively to, and pumping water ballast selectively from, the ballast tanks of each pontoon. Each conduit 94 includes a suitable flexible joint 96 between the hull 20 and the corresponding pontoon 80.

Figure 3:
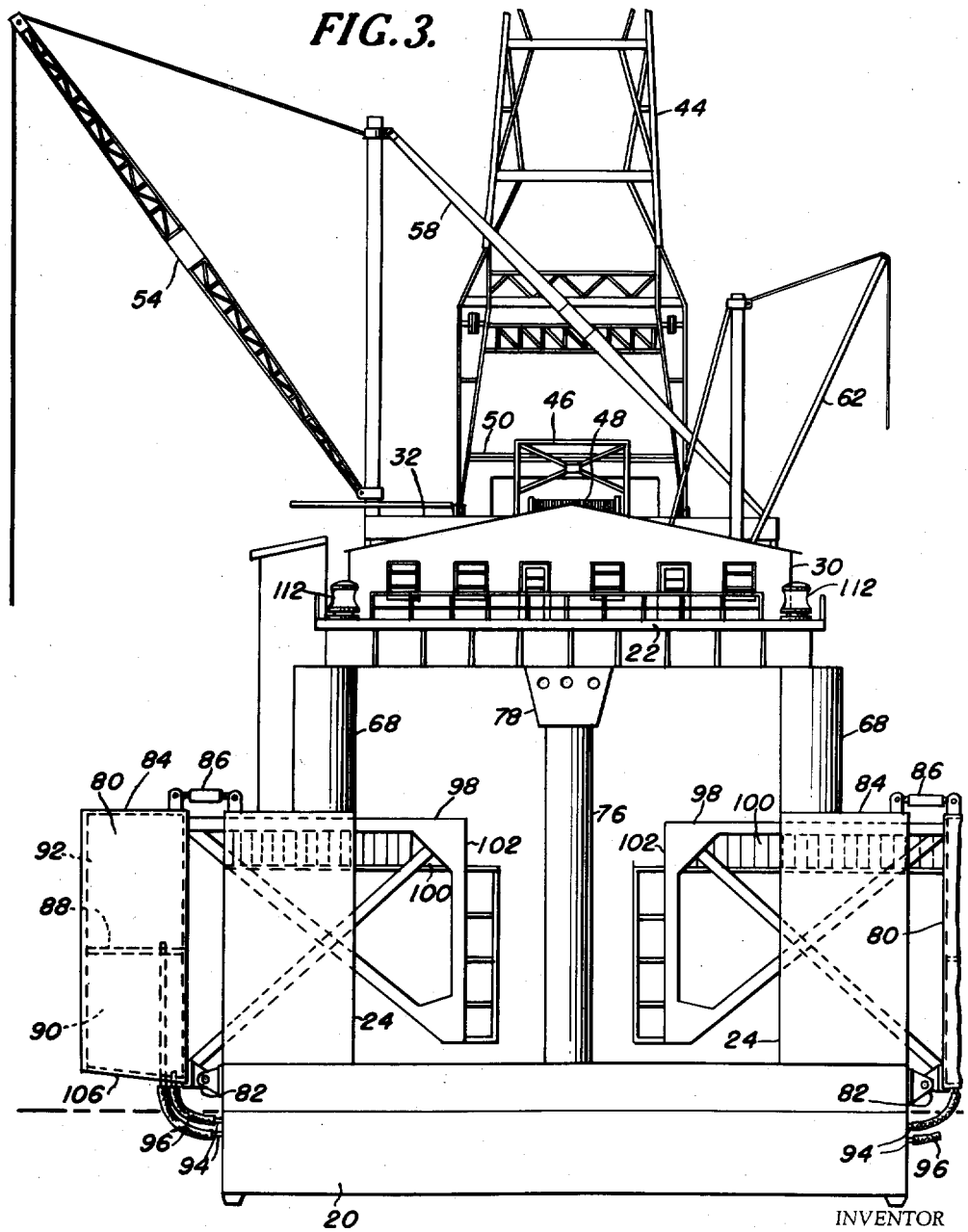
Figure 3 is a front elevational view of the barge shown in Figure 1, but with certain parts thereof shown in the position assumed when the barge is afloat.

Mounted on top of each of the two forward pontoons 80 is an openwork boat-landing structure 98 having an inclined outboard ladder 100 thereon. At the upper end of the ladder 100 a substantially-horizontal walkway 102 extends inboard toward the hull 20. When the pontoons 80 are in their lower position, the walkways 102 are substantially horizontal and on a level with the lower ends of the caisson extensions 68. In this position, removable gangplanks 104 may extend from the walkways 102 to the main deck 22. When the pontoons 80 are in their upper or upright position, as is shown in Figure 3, the boat-landing structures 98 extend inwardly over the hull 20 below the main deck 22 and between the first and second deck-supporting caissons 24.

Figure 4:
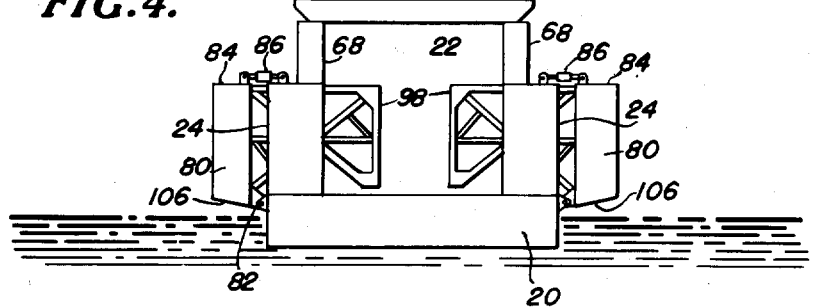
Figures 4, 5 and 6 are schematic front elevational views showing several stages of the operation of submerging the barge shown in Figure 1.
Figure 5:
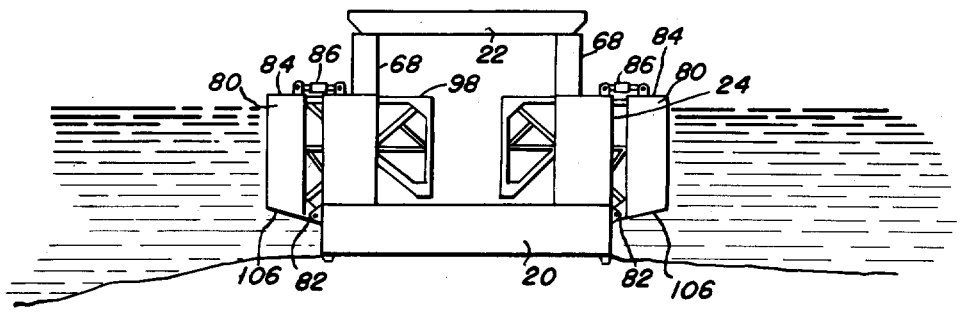

In operation, the barge is towed to a desired location with the pontoons 80 in their upper or upright position and securely retained in this position by the turnbuckles 86 (as shown in Figure 4). On reaching the desired location, the hull 20 is slowly ballasted by flooding the ballast tanks 66 therein substantially uniformly to initiate submergence of the hull. It will be seen that, when the hull 20 sinks beneath the surface of the water, the buoyancy of the four pontoons 80, as well as that of the caissons 24, maintains stability of the entire barge by assuring that its metacenter remains above its center of gravity. In this connection, it will be seen that the weight of the engine room equipment and supplies provides a center of gravity for the entire barge that is as low as possible. If, after the hull has completely submerged, the barge does not sink to the marine bottom because the buoyancy of the pontoons 80, and the caissons 24, is sufficient to support the entire barge, the caissons 24 and, if necessary, the inboard ballast compartments 90 of the pontoons are ballasted to permit the hull to sink even farther beneath the surface, while at the same time maintaining stability of the barge by continuing to maintain its metacenter above its center of gravity. Ballasting of the pontoons 80 and the caissons 24 will then continue until the undersurface of the hull 20 rests on the marine bottom, as shown in Figure 5, at which time the outboard sides 84 of the pontoons, i.e., their tops when in an upright position, still will be slightly above the surface of the water even when the water depth is 40 feet.

Figure 6:
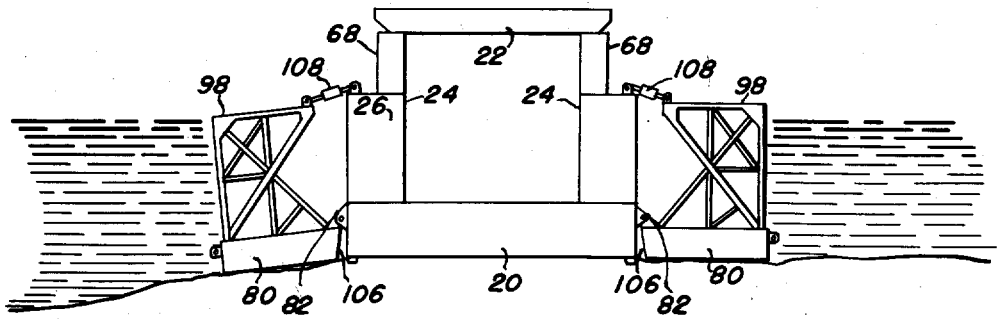

When the hull 20 is on the marine bottom, the turnbuckles 86 securing the pontoons 80 in their upright position are disconnected and the weight of the latter causes them to pivot about their hinges 82 toward the marine bottom. If any air is left in the pontoons 80 at this point, ballasting thereof will continue until they are completely ballasted, so that they will thus slowly descend and rest on the marine bottom. Preferably, the inboard sides 106 of the pontoons diverge downwardly from the adjacent side of the hull 20, so that, in the event that the marine bottom slopes downwardly and outwardly from one side of the hull, the pontoons on that side can pivot or descend farther beyond the point where their undersurfaces are flush with the undersurface of the hull, to thus accommodate themselves to the sloping contour of the marine bottom, as shown in Figure 6.

When the pontoons 80 have thus been sunk, hydraulic jacks preferably are employed to hold each pontoon firmly down into engagement with the marine bottom. Thus, the pontoons 80, for all intents and purposes, become locked to the hull 20 to provide an extended bottom-bearing surface therefor, and thus provide a large foundation area for the barge which will increase its resistance to overturning moments imposed by wind and/or wave actions. At the same time, this large bottom-bearing area increases the resistance of the barge to any sliding forces imposed thereon by wind, waves, floating objects, etc. In the case of each of the two fore pontoons, two hydraulic jacks 108 may be interposed between the boat-landing structure 98 thereon and the adjacent main deck-supporting caissons 24 for maintaining the pontoons in firm engagement with the marine bottom. In the case of the two aft pontoons, a telescoping hydraulic jack 110 may be continuously connected to each pontoon and to the main deck structure 22 for forcing the latter pontoons into firm engagement with the marine bottom. In place of these hydraulic jacks 108 and 110, it is noted that any equivalent mechanism could be used to accomplish the same function and, in fact, to lock the pontoons in their lowermost position in firm engagement with the marine bottom.

When it is desired to refloat and move the barge to another location, the hydraulic jacks 108 are detached and the telescoping hydraulic jacks 110 released, and the pontoons are simultaneously and uniformly unballasted. As the pontoons 80 gain buoyancy, they will float more and more into an upright position and finally, if the water depth is sufficient, will regain their original upright positions and are then secured therein by the aforementioned turnbuckles 86. In the event that the water depth is insufficient to permit the pontoons to float into their upright positions, they may be raised to their upright positions by block and tackle secured to the main deck 22 and to appropriate lugs on the pontoons. Thereafter, the hull 20 is unballasted to refloat the barge. During this refloatation the pontoons 80 and the caissons 24 maintain stability of the barge by maintaining its metacenter above its center of gravity.

At each of the four corners of the main deck 22 is a capstan 112 from which anchors (not shown) are streamed during submerging and refloating operations to keep the barge in proper position. It can be seen that, when the barge is not resting on the marine bottom, the capstans 112 and anchors can be used for emergency maneuvering of the barge without the use of tugs.

It is especially pointed out that, because of the aforedescribed construction wherein the engine room 64 and its associated equipment and supplies are located within the hull 20, the center of gravity of the entire barge is made as low as possible. Additionally, the placement of the engine room 64 within the submergible hull 20 provides a safety feature, in that in the event of a blowout of a well 114 the machinery and supplies in the engine room are located both under water and as far as possible from the derrick 44 and the well head. Hence, such placement serves to minimize any possible damage to the engine room 64 and its contained equipment.

Referring now to Figure 7 of the drawings, it will be seen that, after a well 114 has been completed having the usual well head and Christmas tree 116 thereon, it may be dangerous to attempt to move such a large barge off of an unprotected well, particularly if the well is under high pressure. Accordingly, in order to protect the well from damage by the barge while moving the latter off of the former, the barge is equipped to construct a protective structure about the well prior to moving off the barge. Thus, for example, a large steel protective caisson 118 having an outer diameter less than the width of the drilling slot 28 can be brought to the well location before drilling operations commence and before the barge is submerged. The caisson 118 is held in place in the slot 28 and directly beneath the drilling derrick 44 by any appropriate means for securing the caisson to the barge hull 20 and to the superstructure thereon. After the well 114 has been completed by drilling through the caisson 118, the derrick 44 is lowered to its stowed position and the removable sections 36 and 38 of the drilling floor 32 and of the main deck 22 are removed to expose the large aligned openings 40 and 42 which are of greater area than the area of the protective caisson 118. Thereupon, by use of the large stiff-leg crane 54, metal piles 120 are positioned around the interior of the caisson 118 and in contact with the wall thereof. A pneumatic pile driver 122 is then supported by the crane 54 and the piles 120 driven into the marine bottom. The piles 120 may then be welded, or otherwise secured, to the caisson 118 to provide a small working or productive platform (not shown), as well as a protective structure for the completed well 114. Thereupon, the drilling barge may be refloated and moved off of the well site without undue danger of damaging the same.

In some instances wherein wave action on the barge when submerged is desired to be reduced to a minimum, the somewhat simplified type of barge shown in Figures 12 to 15 may be used. In these views, the showing of the barge is somewhat diagrammatic and illustrates only the floatation and stabilizing structures, while none of the drilling equipment is shown. Furthermore, in this construction all the machinery, pumps, etc., may be mounted on the top deck, instead of in the hull as in the previous embodiment, and the hull in this embodiment is utilized only for ballast compartments for submerging and floatation purposes.

Referring now to Figures 12 to 15, it will be seen that the barge includes a substantially-rectangular hull 124 having a deck 126 supported thereabove on a plurality of relatively-slender posts 128 which may be interconnected by suitable brace members (not shown) to form a trusswork superstructure that offers a minimum of resistance to waves. Hingedly connected to opposite sides of the hull 124 are two submergible pontoons 130, each of substantially the same length as the hull and each having a substantially flat undersurface. In a sense, these large pontoons 130 correspond to, and in their upper position perform the stabilizing functions of, the wing-walls of a floating dry dock. The pontoons 130 are hinged at their upper inboard edges to the upper longitudinal edges of the hull, so that, when the pontoons are in their lower position, as is shown in Figure 15, their flat undersurfaces are substantially flush with the flat undersurface of the hull 124, exactly as is shown in the previously-described embodiment.

Mounted on top of each pontoon 130 are several rigid openwork brace structures 132, substantially triangular in end view, as is shown in Figures 13 to 15. The apexes of these structures 132 are designed to extend slightly above the maximum-depth waterline of the barge when the latter is submerged. Rigidly secured to the deck-supporting posts 128 are several transverse beam or brace members 134 spaced longitudinally along the length of the barge. The ends of these beams 134 project laterally beyond the supporting posts 128 are provided with a plurality of spaced transverse apertures. Adjacent its outboard side, each pontoon 130 is provided with rigid upstanding bracket members 136 adapted to overlap the corresponding ends of the transverse beams 134 and to be bolted thereto to retain the pontoons in their upper position, as is shown in Figures 12 to 14. The apex of each of the openwork brace structures 132 on the pontoons 130 is similarly provided with an apertured bracket member 138 which may be bolted to the corresponding end of a transverse beam member 134 in any one of a number of laterally-adjusted positions, in order to retain the pontoons 130 in firm engagement with a marine bottom after the barge has been sunk thereto, as is shown in Figure 15.

The operations of submerging and refloating the barge shown in Figures 12 to 15 are substantially the same as corresponding operations for the first-described embodiment of the invention. When the barge is afloat and being towed to a drilling site, the pontoons 130 are in their upper position, as is shown in Figures 12 to 14, and are securely retained in these positions by being bolted to the ends of the transverse beams 130. When a drilling site has been reached, the hull 124 is slowly ballasted until it sinks beneath the surface of the water, as is shown in Figure 14. In this position, the barge is fully stabilized and buoyed up by the pontoons 130 which project up above the surface of the water. Ballasting of the pontoons 130 then begins and is slowly continued until the hull 124 sinks gently to rest on a marine bottom, as is shown in Figure 15. The pontoons 130 are then unfastened from the beams 134 and are continued to be ballasted until they lose all of their buoyancy so that they pivot laterally outwardly and downwardly and sink to the marine bottom, also as is shown in Figure 15. In this position of the pontoons 130, the apexes of their rigid openwork brace structures 132 are bolted to the corresponding ends of the transverse beams 134 to form, together with the pontoons and the hull 124, a substantially rigid truss that counteracts lateral overturning moments exerted on the barge by wind and wave action. The steps of refloating the barge are substantially self-evident from the foregoing, and are in accordance with the refloatation steps previously described for the first-described embodiment.

Referring now to Figures 16 to 18 of the drawings, there is shown therein another embodiment of the invention adapted particularly for extremely deep water usage, e.g., of the order of seventy feet or more, wherein the effects of wave action on the barge when submerged must be minimized. This embodiment includes a submergible hull 140 that is substantially rectangular in plan, side, and end views. The hull 140, as in the embodiment shown in Figures 12 to 15, is used solely for floatation and base foundation purposes and is divided into a plurality of interior ballast compartments (not shown). At one end thereof, the hull 140 has a drilling slot 142 (Figure 18). Upstanding from the hull 140 are six rigid openwork columns 144, one at each corner of the hull and one on each side at the center of the hull. An openwork trussed structure 146 is supported on top of the columns 144 and, in turn, has a deck 148 supported thereon. Carried on the main deck 148, but not shown, is all of the drilling equipment, machinery, ballasting equipment, crew quarters, etc.

Hingedly connected to each longitudinal side of the submergible hull 140 are two submergible pontoons 150, each of a length equal to about half of the length of the hull. It will be noted that the inboard hinge members 152 connecting the pontoons 150 to the hull 140 extend somewhat outwardly beyond the side of the hull, to thus space the inboard sides of the pontoons a considerable distance outwardly of the hull when the pontoons are in their lower or "down" position, shown in Figure 18. Thus, the pontoons 148, in their "down" position, can be adjusted to the contour of an inclined marine bottom.

Upstanding from each pontoon 140, when the latter is in its "down" position, are two openwork rigid brace structures 154 that are spaced longitudinally along the pontoon. These brace structures 154 extend upwardly to slightly above the maximum-depth waterline of the barge when the latter is submerged and the pontoons 150 are in their "down" position (Figures 16 and 18). When the pontoons 150 are in their "up" position (Figure 17), these brace structures 154 extend inwardly over the top of the hull 140 in the space below the deck-supporting openwork structure 146 and between the columns 144, and interleaf with the corresponding brace structures of the pontoons on the opposite side. It also will be seen that, when the pontoons 150 are in their "up" position, shown in Figure 17, their outboard sides extend slightly above the maximum-depth waterline of the barge when submerged. If desired, one of the pontoon brace structures 154 may be provided with a horizontal walkway 156 (Figure 18) that forms a boat landing and from which access to the deck 148 is provided by a removable gangplank 158.

Pivotally secured to the deck-supporting trussed structure 146 along the lower edges of the longitudinal sides thereof are a plurality of double-acting hydraulic jacks 160, one for each pontoon brace structure 154. When the pontoons 150 are in their raised position, as is shown in Figure 17, the piston rods of these jacks 160 are detachably pivotally secured to apertured lugs 162 on the pontoons so that the jacks serve to retain the pontoons in their raised or "up" position.

The operation of submerging the barge is exactly the same as that for the barge shown in Figures 12 to 15, namely, the hull 140 is first ballasted and submerged beneath the surface of the water while the barge is stabilized and buoyed up by the pontoons 150. Thereafter, the pontoons 150 are ballasted until the undersurface of the hull 140 comes to rest on the marine bottom, as is shown in Figure 17. Thereupon, the piston rods of the hydraulic jacks 160 are detached from the pontoons 150 and the latter are ballasted until they lose their buoyancy and pivot outwardly and downwardly to sink to the marine bottom, as shown in Figures 16 and 18. In this position of the pontoons 150, their openwork brace structures 154 project above water and the piston rods of the hydraulic jacks 160 are thereupon pivotally connected to the pontoon brace structures and the jacks are preferably supplied with a constant hydraulic pressure to strongly urge all of the pontoons into firm engagement with the marine bottom. Because of the constant pressure exerted by the hydraulic jacks 160, the deck-supporting trussed structure 146, together with the jacks and the pontoon brace structures 150, creates a rigid truss effect for the pontoons laterally of the barge which prevents upward pivotal movement of the pontoons in response to lateral overturning moments exerted on the barge by wind and/or wave action.

It also will be seen that the pontoons 150 shown in the embodiments of Figures 12 to 18 not only greatly increase the bottom-bearing area of the entire barge when submerged, but also serve to stabilize the barge during both submerging and refloating operations and also when sunk to a marine bottom.

It thus will be seen that the objects of this invention have been fully and effectively accomplished. It will be realized, however, that the specific embodiments shown and described for the purpose of illustrating the principles of this invention are subject to change without departure from such principles. Therefore, this invention includes all modifications encompassed within the spirit and scope of the following claims.

We claim:
1. A submergible barge for marine operations comprising: a water-tight submergible hull having a substantially flat under surface; means for ballasting and unballasting said hull, the buoyancy of said hull when unballasted being sufficient to float the entire barge; a central compartment in said hull; an openwork rigid supporting structure mounted on said hull and extending thereabove; a deck carried on the upper portion of said structure for location above water when said hull is sunk to a marine bottom in water of a depth less than the vertical distance between said deck and the undersurface of said hull; well-drilling equipment mounted on said deck; power means located in said hull compartment for operation of said drilling equipment; means defining an enclosed passageway providing access to said compartment from said deck; at least one pair of submergible pontoons, generally rectangular in transverse cross-section, directly connected to said hull on opposite sides and at locations above said under surface thereof for lateral pivotal movement between upper and lower positions, each said pontoon in its upper position having substantially no vertical separation between it and said hull and a center of displacement above that of said hull and in its lower position having a substantially flat undersurface substantially flush with said hull undersurface to provide an extended bearing area for the barge engageable with the marine bottom, the distance between said hull undersurface and the uppermost part of said pontoon, when in its upper position, being at least as great as the water depth at a submergence site; and means for ballasting and unballasting said pontoons.

2. The structure defined in claim 1 including means for securing each pontoon in its upper position.

3. The structure defined in claim 1 including means engaged with the hull and each pontoon for urging the latter to pivot in a direction away from its upper position.

4. The structure defined in claim 1 in which the hull includes a plurality of separate ballast compartments and the openwork supporting structure includes a series of caissons spaced longitudinally along each side of said hull, certain said caissons being in open communication with a separate one of said ballast compartments located immediately therebelow.

5. A submergible barge for marine operations comprising: a submergible hull; an openwork rigid supporting structure mounted thereon and extending thereabove; a deck carried by said structure above said hull for location above water when said hull is sunk to a marine bottom in water of a depth less than the vertical distance between the undersurface of said hull and said deck; at least one submergible pontoon connected to said hull at one side thereof for pivotal movement between upper and lower positions about an axis extending generally parallel to said hull side, said pontoon having an extended undersurface disposed substantially flush with said hull undersurface when said pontoon is in its lower position; and a boat-landing structure mounted on top of said pontoon for projection above said hull when said pontoon is in its lower position, said boat-landing structure being movable with said pontoon and disposed in the space between said hull and said deck and between supporting elements of said openwork structure when said pontoon is in its upper position.

6. The structure defined in claim 5 including extensible means engaged with the supporting structure and the boat-landing structure for urging the pontoon to pivot in a direction away from its upper position.

7. A submergible barge for submarine drilling operations comprising: a submergible floatation structure provided with a vertical opening therethrough for conducting drilling operations through said opening; an openwork rigid supporting structure mounted on said floatation structure and extending thereabove; a deck carried by said supporting structure above said floatation structure and extending over said opening; a drilling derrick mounted on said deck over said opening for pivotal movement between an upright operating position and a generally-horizontal stowed position; a rotary mounted on said deck beneath said derrick, sections of said deck over said opening, and said rotary, being removable to provide an enlarged opening in said deck over said floatation structure opening; and pile-driving apparatus carried on said supporting structure above said floatation structure for operation through said openings, when said derrick is in its stowed position, in order to erect a producing platform about a completed well.

8. A submergible barge for marine operations comprising: a submergible hull; an openwork rigid supporting structure mounted thereon and extending thereabove; a deck carried by said structure above said hull for location above water when said hull is sunk to a marine bottom in water of a depth less than the vertical distance between the undersurface of said hull and said deck; and at least one pair of submergible pontoons, generally rectangular in transverse cross-section, directly connected to said hull on opposite sides thereof for pivotal movement between upper and lower positions about spaced axes extending longitudinally of said hull at the upper edges of the sides thereof, each said pontoon having an extended generally flat undersurface disposed substantially flush with the undersurface of said hull when said pontoon is in its lower position, and substantially all of each said pontoon extending above said hull with substantially no vertical separation therebetween when said pontoon is in its upper position, the distance between said hull undersurface and the uppermost part of said pontoon, when in its upper position, being at least as great at the water depth at a submergence site.

9. The structure defined in claim 8 including constant-force-maintaining means engaged with the hull and each pontoon for urging the latter to pivot in a direction away from its upper position into engagement with a marine bottom when the hull is sunk thereto.

10. The structure defined in claim 8 wherein the opposed side portions of each pontoon and the hull diverge from each other generally downwardly when said pontoon is in its lowered position with its under surface substantially in the same plane with the hull under surface, whereby said pontoon can be lowered still further to accommodate itself to the contours of a non-flat marine bottom.

11. The structure defined in claim 8 including means to substantially lock each pontoon in its raised position and means to substantially lock each pontoon in its lowered position.

12. The structure defined in claim 11 wherein the last-mentioned means is adjustable to lock the pontoon in a range of lowered positions.

13. A submergible barge for marine operations comprising: a submergible hull; an openwork rigid supporting structure mounted thereon and extending thereabove; a deck carried by said structure above said hull for location above water when said hull is sunk to a marine bottom in water of a depth less than the vertical distance between the undersurface of said hull and said deck; at least one pair of submergible pontoons, generally rectangular in transverse cross-section, directly connected to said hull on opposite sides thereof for pivotal movement between upper and lower positions about spaced axes extending longitudinally of said hull, each said pontoon extending above said hull when said pontoon is in its upper position; an openwork rigid structure mounted on each pontoon and extending upwardly therefrom, when said pontoon is in its lower position, to a level below said deck; and detachable means engaged with said supporting structure and said structure on each pontoon for urging the latter to pivot in a direction to engage a marine bottom when the hull is sunk thereto.

14. The structure defined in claim 13 in which the urging means comprises constant-pressure fluid-power means.

References Cited in the file of this patent

UNITED STATES PATENTS

| Number | Name | Date |
|---|---|---|
| 123,402 | Janicki | Feb. 6, 1872 |
| 720,997 | Becker | Feb. 17, 1903 |
| 1,108,001 | Quimby | Aug. 18, 1914 |
| 1,486,606 | Pimpinella | Mar. 11, 1924 |
| 1,708,784 | Carloni | Apr. 9, 1929 |
| 2,248,051 | Armstrong | July 8, 1941 |
| 2,475,933 | Woolslayer et al. | July 12, 1949 |
| 2,525,955 | Scott | Oct. 17, 1950 |
| 2,540,878 | Hayward | Feb. 6, 1951 |
| 2,551,375 | Hayward | May 1, 1951 |
| 2,589,153 | Smith | Mar. 11, 1952 |
| 2,594,773 | Harris | Apr. 29, 1952 |
| 2,600,761 | Halliburton | June 17, 1952 |
| 2,669,846 | Shannon | Feb. 23, 1954 |
| 2,691,272 | Townsend | Oct. 12, 1954 |
| 2,771,747 | Rechtin | Nov. 27, 1956 |

FOREIGN PATENTS

| Number | Country | Date |
|---|---|---|
| 185,255 | Great Britain | Sept. 7, 1922 |

OTHER REFERENCES

Oil & Gas Journal of January 18, 1947, pp. 56, 59, 60.
World Oil of February 1, 1950, pp. 108, 110, 112.